(12) United States Patent
Park

(10) Patent No.: US 8,534,772 B2
(45) Date of Patent: *Sep. 17, 2013

(54) HYDRAULIC BRAKE SYSTEM

(75) Inventor: Seung Young Park, Gyeonggi-do (KR)

(73) Assignee: Mando Corporation, Pyeongtaek-Si (KR)

( * ) Notice: Subject to any disclaimer, the term of this patent is extended or adjusted under 35 U.S.C. 154(b) by 98 days.

This patent is subject to a terminal disclaimer.

(21) Appl. No.: 13/215,611

(22) Filed: Aug. 23, 2011

(65) Prior Publication Data

US 2012/0043805 A1 Feb. 23, 2012

(30) Foreign Application Priority Data

Aug. 23, 2010 (KR) .......................... 10-2010-0081198

(51) Int. Cl.
  *B60T 8/32* (2006.01)
(52) U.S. Cl.
  USPC .......................................... 303/113.1; 303/87
(58) Field of Classification Search
  USPC .......... 303/113.1–113.5, 116.1, 116.2, 116.4, 303/10, 11, 87
  See application file for complete search history.

(56) References Cited

U.S. PATENT DOCUMENTS

| 4,989,924 | A * | 2/1991 | Toda et al. ................. 303/113.1 |
| 6,375,279 | B1 * | 4/2002 | Cassidy et al. ............. 303/116.1 |
| 7,093,911 | B2 * | 8/2006 | Hool et al. ................. 303/113.5 |
| 7,309,112 | B2 | 12/2007 | Isono |
| 2004/0256912 | A1 * | 12/2004 | Hamada et al. ............ 303/113.5 |
| 2009/0096280 | A1 * | 4/2009 | Yamanao et al. ............. 303/11 |
| 2010/0187901 | A1 * | 7/2010 | Sonoda et al. ................ 303/11 |
| 2012/0025598 | A1 * | 2/2012 | Park et al. ....................... 303/2 |
| 2012/0025599 | A1 * | 2/2012 | Park ............................ 303/6.01 |
| 2012/0049616 | A1 * | 3/2012 | Park ............................ 303/9.62 |

FOREIGN PATENT DOCUMENTS

| JP | 2602155 | 10/1999 |
| JP | 2007-186142 | 7/2007 |
| JP | 2010-013069 | 1/2010 |

* cited by examiner

*Primary Examiner* — Christopher Schwartz
(74) *Attorney, Agent, or Firm* — McDermott Will & Emery LLP

(57) ABSTRACT

A hydraulic brake system includes: a master cylinder forming a braking hydraulic pressure according to an operation of a brake pedal; wheel brakes provided in front and rear wheels of a vehicle to receive the braking hydraulic pressure of the master cylinder and exert a braking force; a first hydraulic circuit controlling an oil pressure transmission by connecting a first port of the master cylinder and two wheel brakes; a second hydraulic circuit controlling an oil pressure transmission by connecting a second port of the master cylinder and remaining two wheel brakes; a hydraulic block communicating main passages of the first and second hydraulic circuits with each other, the hydraulic block being provided with a communication passage having one side opened, such that the first and second hydraulic circuits pass through the communication and a damper member including a stepped piston embedded into the hydraulic block and reciprocating the communication passage.

5 Claims, 2 Drawing Sheets

HYDRAULIC BRAKE SYSTEM

CROSS-REFERENCE(S) TO RELATED APPLICATION

This application claims priority of Korean Patent Application No. 10-2010-081198, filed on Aug. 23, 2010, in the Korean Intellectual Property Office, which is hereby incorporated by reference in its entirety.

BACKGROUND OF THE INVENTION

1. Field of the Invention

The present invention relates to a brake system, and more particularly, to a hydraulic brake system capable of reducing pressure pulsation that is generated by a piston pump driven by a hydraulic motor upon operation of a brake system.

2. Description of the Related Art

A hydraulic brake system is essentially mounted on a vehicle, and a variety of systems for obtaining a stronger and more stable braking force have recently been proposed.

Examples of a hydraulic brake system include an Anti-lock Brake System (ABS), a Brake Traction Control System (BTCS), and a Vehicle Dynamic Control System (VDC). The ABS prevents wheels from skidding upon braking. The BTCS prevents slip of driving wheels against sudden departure or sudden unintended acceleration of a vehicle. The VDC stably maintains a driving state of a vehicle by controlling a brake oil pressure through a combination of the ABS and the BTCS.

Such a hydraulic brake system includes a master cylinder for generating a pressure necessary for braking, a plurality of solenoid valves for controlling a braking hydraulic pressure transmitted to a wheel brake of a vehicle, a low pressure accumulator for temporarily storing oil, a pump and a motor for forcibly pumping the oil stored in the low pressure accumulator, an orifice for reducing the pressure pulsation of the oil pumped by the pump, and an Electronic Control Unit (ECU) for electrically controlling the operations of the solenoids and the pump.

The valve assembly of the solenoids, the accumulator, the pump, and the motor are compactly installed in a hydraulic block (modulator block) made of aluminum, and the ECU is provided with an ECU housing in which the coil assembly of the solenoid valves and a circuit board are embedded, and is coupled to the hydraulic block.

However, in the conventional hydraulic brake system, as described above, rapid pressure pulsation generated by the driving of the pump in the process of increasing the braking pressure is reduced by the orifice provided in a discharge port side of the pump. Since this is achieved by a configuration that adjusts a cross-sectional area of a passage simply in order to reduce a damping, there is a limitation in completely reducing pressure pulsation.

In addition, another method for reducing pressure pulsation is to increase the number of pistons of a pump. This method increases the overall performance of a motor and the weight and volume of a module, leading to an increase in a manufacturing cost of the pump.

If a peak of pressure pulsation caused by the driving of the pump is successively generated, it may cause the generation of operating noise in a brake system.

SUMMARY OF THE INVENTION

An aspect of the present invention is directed to a hydraulic brake system capable of reducing periodic pressure pulsation generated by the driving of a pump.

According to an embodiment of the present invention, a hydraulic brake system includes: a master cylinder forming a braking hydraulic pressure according to an operation of a brake pedal; wheel brakes provided in front and rear wheels of a vehicle to receive the braking hydraulic pressure of the master cylinder and exert a braking force; a first hydraulic circuit controlling an oil pressure transmission by connecting a first port of the master cylinder and two wheel brakes; a second hydraulic circuit controlling an oil pressure transmission by connecting a second port of the master cylinder and remaining two wheel brakes; a hydraulic block communicating main passages of the first and second hydraulic circuits with each other, the hydraulic block being provided with a communication passage having one side opened, such that the first and second hydraulic circuits pass through the communication passage; a pump mounted on one side of each of the main passages, with reference to the hydraulic block, to discharge oil through the hydraulic block to the wheel brake side or the master cylinder side; an orifice mounted on each of the other side of the main passages, with reference to the hydraulic block; and a damper member including: a piston embedded into the hydraulic block and reciprocating the communication passage, the piston having stepped portions on both ends thereof; a cap sealing the opened side of the communication passage and mounted on the hydraulic block; and a spring mounted on each of the stepped portions to elastically support the piston between the cap and the closed side of the communication passage.

In addition, the piston of the hydraulic brake system may include a seal member that mutually isolates the first hydraulic circuit from the second hydraulic circuit.

<Reference Numerals>

Figure 1:
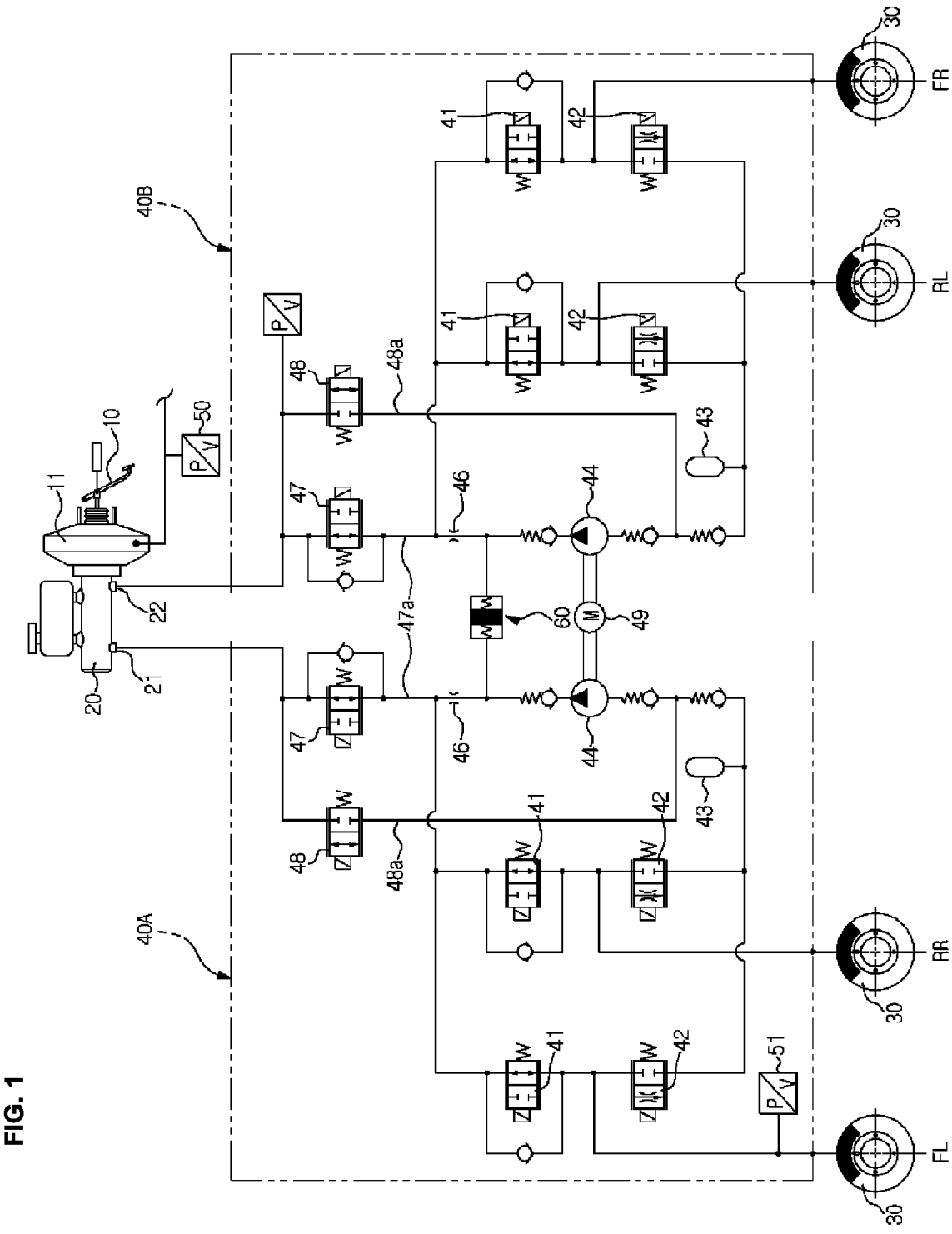
FIG. 1 is a view illustrating a hydraulic brake system according to an embodiment of the present invention.

| | |
|---|---|
| 1: | hydraulic block |
| 10: | brake pedal |
| 20: | master cylinder |
| 30: | wheel brake |
| 40A, 40B: | first and second hydraulic circuits |
| 41, 42: | solenoid valves |
| 44: | pump |
| 46: | orifice |
| 47: | normal open type solenoid valve |
| 47a: | main passage |
| 48: | shuttle valve |
| 49: | driving motor |
| 60: | damper member |
| 61: | cap |
| 62: | piston |
| 62a: | stepped portion |
| 63a: | spring |
| 65: | seal member |

DETAILED DESCRIPTION OF EXEMPLARY EMBODIMENTS

Exemplary embodiments of the present invention will be described below in more detail with reference to the accompanying drawings. The present invention may be embodied in different forms and should not be construed as limited to the embodiments set forth herein.

A hydraulic brake system according to an embodiment of the present invention includes a brake pedal 10 for receiving a driver's manipulation force, a brake booster 11 for increasing foot power using a pressure difference between vacuum pressure and atmospheric pressure by the foot power of the brake pedal 10, a master cylinder 20 for generating a pressure by the brake booster 11, a first hydraulic circuit 40A for controlling an oil pressure transmission by connecting a first port 21 of the master cylinder 20 and two wheel brakes (or wheel cylinders) 30, and a second hydraulic circuit 40B for controlling an oil pressure transmission by connecting a second port 22 of the master cylinder 20 and the remaining two wheel brakes 30. The first hydraulic circuit 40A and the second hydraulic circuit 40B are compactly installed in the hydraulic block (1 in FIG. 2).

The first hydraulic circuit 40A and the second hydraulic circuit 40B include solenoid valves 41 and 42 for controlling a braking hydraulic pressure transmitted to two wheel brakes 30, a pump 44 for sucking oil leaking from the wheel brake 30 or the master cylinder 20, a low pressure accumulator 43 for temporarily storing oil leaking from the wheel brake 30, an orifice 46 for reducing pressure pulsation from oil pressure that is pumped from the pump 44, and an auxiliary passage 48a for guiding oil of the master cylinder 20 to be sucked into the inlet of the pump 44 in a TCS mode.

The plurality of solenoid valves 41 and 42 are coupled to an upstream and a downstream of the wheel brake 30. The plurality of solenoid valves 41 and 42 are classified into a normal open type solenoid valve 41 and a normal close type solenoid valve 42. The normal open type solenoid valve 41 is disposed in the upstream side of each wheel brake 30 and maintains an open state in a normal mode. The normal close type solenoid valve 42 is disposed in a downstream side of each wheel brake 30 and maintains a closed state in a normal mode.

The on-off operation of the solenoid valves 41 and 42 is controlled by an ECU (not shown) that detects a vehicle speed through a wheel speed sensor disposed in each wheel. When the normal close type solenoid valve 42 is opened according to the depressurizing braking, oil leaking from the wheel brake 30 is temporarily stored in the low pressure accumulator 43.

The pump 44 is driven by the motor 45 to transmit oil pressure toward the wheel brake 30 or the master cylinder 20 by sucking the oil stored in the low pressure accumulator 43 and discharge the sucked oil toward the orifice 46.

A damper member 60 for reducing pressure pulsation of the pump 44 is provided between a discharge port of the pump 44 and the orifice 46. The damper member 60 will be described later.

A normal open type solenoid valve 47 for a traction control system (TCS) (hereinafter, referred to as a TC valve) is installed in a main passage 47a for connecting the master cylinder 20 and the outlet of the pump 44.

The TC valve 47 maintains an open state in a normal mode, and brake oil pressure generated in the master cylinder 20 by a general braking through the brake pedal 10 is transmitted to the wheel brake 30 through the main passage 47a.

The auxiliary passage 48a is branched from the main passage 47a and guides the oil of the master cylinder 20 to be sucked into the inlet of the pump 44. A shuttle valve 48 is installed such that the oil flows to only the inlet of the pump 44.

The electrically operating shuttle valve 48 is installed in the middle of the auxiliary passage 48a, and the shuttle valve 48 is closed in a normal mode and is opened in a TCS mode.

Meanwhile, a pressure sensor 50 for detecting vacuum pressure of the brake booster 11 and atmospheric pressure is installed in the brake booster 11, and a wheel pressure sensor 51 is provided in front left/right wheels FL and FR and rear left/right wheels RL and RR to detect actual braking pressures applied thereto.

The pressure sensors 50 and 51 are electrically connected to and controlled by the ECU.

The damper member 60 is press-fitted into a communication passage 47b provided to communicate with each main passage 47a of the first and second hydraulic circuits 40A and 40B installed in the hydraulic block.

Figure 2:
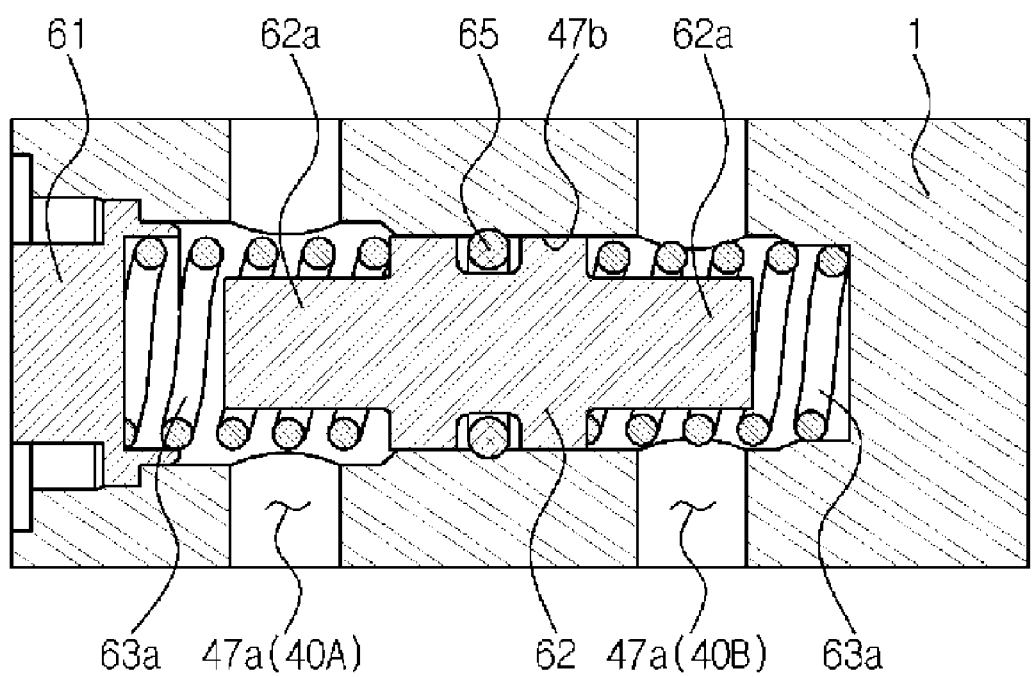
FIG. 2 is a sectional view illustrating a damper member of the hydraulic brake system according to the embodiment of the present invention.

As illustrated in FIG. 2, the damper member 60 includes a cap 61 that is press-fitted into or spirally coupled to the cylindrical communication passage 47b in the inside of the hydraulic block 1 with one side opened. In this manner, the cap 61 seals the communication passage 47b.

A piston 62 is provided in the inside of the damper member 60 such that it is reciprocatably movable in the center of the damper member 60 along the longitudinal direction of the communication passage 47b. A spring 63a is inserted onto the outer periphery of a stepped portion 62a of the piston 62, and elastically supports the piston 62 at both ends of the communication passage 47b.

The piston 62 is provided with a rubber seal member 65 for isolating and sealing the first and second hydraulic circuits 40A and 40B at the periphery of the central portion.

In addition, the stepped portions 62a of the piston 62 are separately installed in the inner surface of the cap 61 and the end of the communication passage opposite to the inner surface of the cap 61, thereby forming a damping space for reducing pulsation. The stepped portion 62a is long enough to restrict the operating displacement of the piston 62.

It is apparent that the length of the stepped portion 62a can be appropriately varied so as to restrict the operating displacement of the piston 62, that is, the piston 62 can be replaced with a piston having stepped portions with various lengths.

Since the above-described damper member 60 can control the pressure pulsations of both the first and second hydraulic circuits 40A and 40B using the single piston 62, it is superior in terms of energy efficiency.

In addition, a dead volume restricting a fluid flow is minimized by simplifying the structure of the piston 62, and the assembly with the hydraulic block 1 is facilitated.

Hereinafter, the overall operation of the hydraulic brake system according to the embodiment of the present invention will be described.

First, a driver presses down the brake pedal 10 so as to slow down the vehicle while driving or maintain a stationary state.

Therefore, a boosted force higher than the input force is generated in the brake booster 11 and a considerable braking hydraulic pressure is generated in the master cylinder 20.

The braking operation is performed in such a manner that the braking hydraulic pressure is transmitted to the front wheels FR and FL and the rear wheels RR and RL through the solenoid valve 41.

If the driver takes his/her foot off the brake pedal 10 gradually or completely, oil pressure inside each wheel brake is returned to the master cylinder 20 through the solenoid valve 41. Thus, the braking force is reduced or the braking operation is completely released.

Meanwhile, pressure pulsation having a regular half sine wave is generated in the brake system due to a pair of pumps 44 that is driven with 180-degree phase difference by a single driving motor 49 during the braking operation. This pressure pulsation is attenuated by the damper member 60.

Therefore, the pressure pulsation of the regular half sine wave is completely removed by the damper member 60 and the orifice 46, and the regular oil pressure is transmitted to the master cylinder 20 or the solenoid valve 41.

The hydraulic brake system according to the embodiments of the present invention can attenuate the periodic pressure pulsation generated by the driving of the pump.

According to the hydraulic brake system of the present invention, the damper member is installed between the outlet port of the pump and the orifice to communicate the main passages of the first and second hydraulic circuits with each other. Since the pressure pulsation generated by the driving of the pump is attenuated, the overall operating noise during the brake control is reduced and the reliability of products is increased.

While the invention has been shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A hydraulic brake system, comprising:
    a master cylinder forming a braking hydraulic pressure according to an operation of a brake pedal;
    wheel brakes disposed in front and rear wheels of a vehicle to receive the braking hydraulic pressure of the master cylinder and exert a braking force;
    a first hydraulic circuit controlling an oil pressure transmission by connecting a first port of the master cylinder and two of the wheel brakes;
    a second hydraulic circuit controlling an oil pressure transmission by connecting a second port of the master cylinder and remaining two of the wheel brakes;
    a hydraulic block communicating main passages of the first and second hydraulic circuits with each other, the hydraulic block having a communication passage having one side opened, such that the first and second hydraulic circuits pass through the communication passage;
    a pump disposed on one side of each of the main passages, with reference to the hydraulic block, to discharge oil through the hydraulic block to the wheel brake side or the master cylinder side;
    an orifice disposed on each of the other side of the main passages, with reference to the hydraulic block; and
    a damper member, including:
        a piston embedded into the hydraulic block and reciprocating in the communication passage, the piston having stepped portions on both ends thereof such that a diameter of the stepped portions is smaller than a diameter of a central portion of the piston;
        a cap sealing the opened side of the communication passage and disposed on the hydraulic block, the cap having an opening towards the communication passage; and
        a spring disposed on each of the stepped portions to be received in the opening of the cap such that the piston is elastically supported between the cap and the closed side of the communication passage.

2. The hydraulic brake system according to claim 1, wherein the damper member further includes a seal member that mutually isolates the first hydraulic circuit from the second hydraulic circuit along an outer periphery of the central portion of the piston.

3. The hydraulic brake system according to claim 1, wherein the cap is press-fitted into or spirally coupled to the hydraulic block to seal the communication passage.

4. The hydraulic brake system according to claim 1, wherein the stepped portions of the piston are separately disposed in the inner surface of the cap and the end of the communication passage opposite to the inner surface of the cap, such that a damping space for reducing pulsation is formed.

5. The hydraulic brake system according to claim 1 wherein a length of the stepped portions is set such that the operating displacement of the piston is restricted.

\* \* \* \* \*